US008305976B1

(12) United States Patent
Vargantwar et al.

(10) Patent No.: US 8,305,976 B1
(45) Date of Patent: Nov. 6, 2012

(54) EFFICIENT WIRELESS COMMUNICATION NETWORK ENTRY FOR WIRELESS COMMUNICATION DEVICES

(75) Inventors: Sachin R. Vargantwar, Overland Park, KS (US); Deveshkumar Narendrapratap Rai, Overland Park, KS (US); Ashish Bhan, Shawnee, KS (US); Bhagwan Singh Khanka, Lenexa, KS (US); Jasinder Pal Singh, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 622 days.

(21) Appl. No.: 12/485,247

(22) Filed: Jun. 16, 2009

(51) Int. Cl.
 *H04W 4/00* (2009.01)
 *H04B 7/216* (2006.01)
(52) U.S. Cl. ........................................ 370/329; 370/335
(58) Field of Classification Search .................. None
 See application file for complete search history.

(56) References Cited

U.S. PATENT DOCUMENTS

| 7,197,328 | B2  | 3/2007 | Hart et al. |     |
|-----------|-----|--------|------------|-----|
| 2001/0024431 | A1* | 9/2001 | Koo et al. | 370/335 |
| 2005/0202818 | A1* | 9/2005 | Hondo et al. | 455/434 |
| 2006/0019687 | A1  | 1/2006 | Garg et al. |     |
| 2009/0252125 | A1* | 10/2009 | Vujcic | 370/336 |
| 2010/0034177 | A1* | 2/2010 | Santhanam | 370/338 |

\* cited by examiner

*Primary Examiner* — Marcus R Smith (57) ABSTRACT

What is disclosed is a method of operating a wireless communication device. The method includes, when in a first mode of operation, transmitting an access request to a wireless access node at a first transmit power, starting a first countdown timer, and awaiting an access request acknowledge from the wireless access node. In the first mode of operation, if the access request acknowledge is received within the first countdown timer, the method includes halting the first countdown timer and awaiting a resource assignment message from the wireless access node, and if the access request acknowledge is not received within the first countdown timer, the method includes retransmitting the access request to the wireless access node at a second transmit power and restarting the first countdown timer. The method also includes receiving a control message to enter a second mode of operation from the wireless access node, and when in the second mode of operation, transmitting the access request to the wireless access node, starting a second countdown timer, and awaiting the resource assignment message from the wireless access node. In the second mode of operation, if the resource assignment message is received within the second countdown timer, the method includes halting the second countdown timer, and if the resource assignment message is not received within the second countdown timer, the method includes retransmitting the access request to the wireless access node and restarting the second countdown timer.

20 Claims, 6 Drawing Sheets

EFFICIENT WIRELESS COMMUNICATION NETWORK ENTRY FOR WIRELESS COMMUNICATION DEVICES

TECHNICAL FIELD

Aspects of the disclosure are related to the field of communications, and in particular, wireless communication protocols in wireless communication networks.

TECHNICAL BACKGROUND

Wireless communication systems typically include wireless access nodes, such as base stations, which coordinate wireless communications between wireless communication devices and a wireless communication network. In many examples of wireless communication systems, a network entry or access process must be completed before user communications can be exchanged between the wireless communication device and the wireless communication network.

The network access process could include different portions during which a wireless communication device and a wireless access node exchange information related to initiating communications with the wireless communication network. This information related to initiating communications is typically transferred over a wireless link between the wireless communication device and the wireless access node.

OVERVIEW

What is disclosed is a method of operating a wireless communication device. The method includes, when in a first mode of operation, transmitting an access request to a wireless access node at a first transmit power, starting a first countdown timer, and awaiting an access request acknowledge from the wireless access node. In the first mode of operation, if the access request acknowledge is received within the first countdown timer, the method includes halting the first countdown timer and awaiting a resource assignment message from the wireless access node, and if the access request acknowledge is not received within the first countdown timer, the method includes retransmitting the access request to the wireless access node at a second transmit power and restarting the first countdown timer. The method also includes receiving a control message to enter a second mode of operation from the wireless access node, and when in the second mode of operation, transmitting the access request to the wireless access node, starting a second countdown timer, and awaiting the resource assignment message from the wireless access node. In the second mode of operation, if the resource assignment message is received within the second countdown timer, the method includes halting the second countdown timer, and if the resource assignment message is not received within the second countdown timer, the method includes retransmitting the access request to the wireless access node and restarting the second countdown timer.

What is disclosed is a wireless communication device. The wireless communication device includes a transceiver configured to transmit an access request to a wireless access node at a first transmit power when in a first mode of operation, and a processing system configured to start a first countdown timer upon transmission of the access request and await an access request acknowledge from the wireless access node when in the first mode of operation. In the first mode of operation, if the access request acknowledge is received within the first countdown timer, the processing system is configured to halt the first countdown timer and await a resource assignment message from the wireless access node, and if the access request acknowledge is not received within the first countdown timer, the transceiver is configured to retransmit the access request to the wireless access node at a second transmit power and the processing system is configured to restart the first countdown timer. The transceiver is also configured to receive a control message to enter a second mode of operation from the wireless access node. The transceiver is configured to transmit the access request to the wireless access node when in the second mode of operation, and the processing system configured to start a second countdown timer upon transmission of the access request and await the resource assignment message from the wireless access node when in the second mode of operation. In the second mode of operation, if the resource assignment message is received within the second countdown timer, the processing system is configured to halt the second countdown timer, and if the resource assignment message is not received within the second countdown timer, the transceiver is configured to retransmit the access request to the wireless access node and the processing system is configured to restart the second countdown timer.

What is also disclosed is a method of operating a wireless communication system. The method includes, in a wireless communication device when in a first mode of operation, transmitting an access request to a wireless access node at a first transmit power, starting a first countdown timer, and awaiting an access request acknowledge from the wireless access node. In the wireless communication device when in the first mode of operation, if the access request acknowledge is received within the first countdown timer, halting the first countdown timer and awaiting a resource assignment message from the wireless access node, and if the access request acknowledge is not received within the first countdown timer, retransmitting the access request to the wireless access node at a second transmit power and restarting the first countdown timer. The method also includes, in the wireless communication device, receiving a control message to enter a second mode of operation from the wireless access node, and in the wireless communication device when in the second mode of operation, transmitting the access request to the wireless access node, starting a second countdown timer, and awaiting the resource assignment message from the wireless access node. In the wireless communication device when in the second mode of operation, if the resource assignment message is received within the second countdown timer, halting the second countdown timer, and if the resource assignment message is not received within the second countdown timer, retransmitting the access request to the wireless access node and restarting the second countdown timer.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
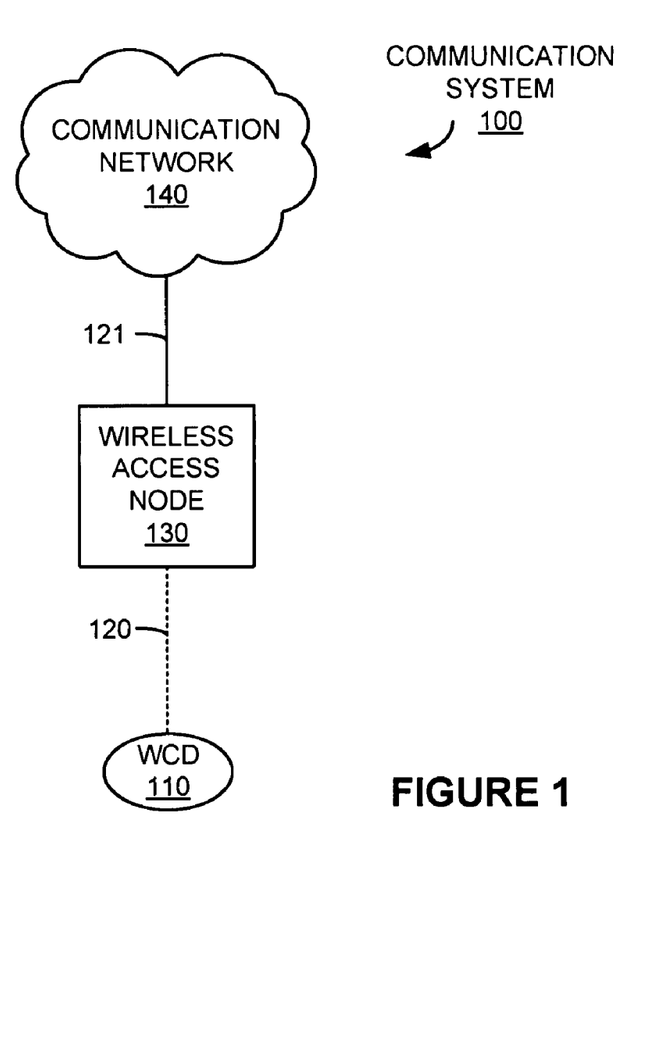
FIG. 1 is a system diagram illustrating a communication system.

FIG. 1 is a system diagram illustrating communication system 100. Communication system 100 includes wireless communication device 110, wireless access node 130, and communication network 140. Wireless communication device 110 and wireless access node 130 communicate over wireless link 120. Wireless access node 130 and communication network communicate over link 121.

In FIG. 1, wireless communication device 110 can receive wireless communication service through wireless access node 130. Before wireless communication service can commence between wireless communication device 110 and wireless access node 130, a network access or network entry process occurs. This network entry procedure can include the exchange of identification, registration, and protocol information between wireless access node 130 and wireless communication device 110. However, in many examples, wireless communication device 110 must make wireless access node 130 aware of its presence and intention to initiate wireless communications during the network entry process.

Figure 2:
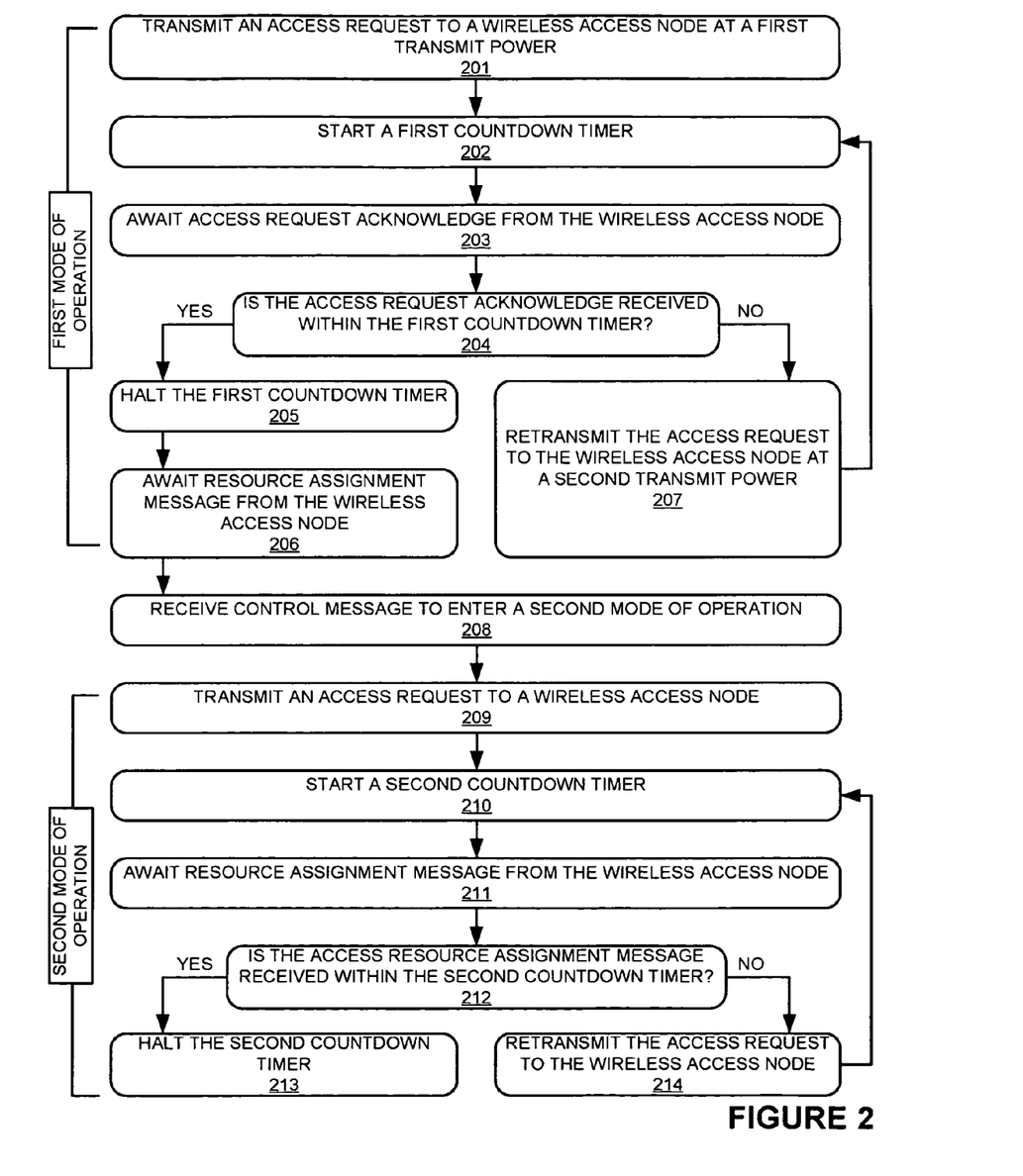
FIG. 2 is a flow diagram illustrating a method of operation of a wireless communication device.

FIG. 2 is a flow diagram illustrating a method of operation of wireless communication device 110. The operations in FIG. 2 are referenced herein parenthetically. In FIG. 2, wireless communication device 110 is initially in a first mode of operation. While in the first mode of operation, when requesting wireless communication access through wireless access node 130, wireless communication device 110 transmits (201) an access request to wireless access node 130 at a first transmit power and starts (202) a first countdown timer. Wireless communication device 110 then awaits (203) an access request acknowledge from wireless access node 130. Wireless communication device 110 determines (204) if the access request acknowledge is received within the first countdown timer period. If the access request acknowledge is not received within the first countdown timer period, wireless communication device retransmits (207) the access request to wireless access node 130 at a second transmit power. In some examples, the first countdown timer is then restarted and wireless communication device awaits the access request acknowledge again as in operations 202-204.

However, when in the first mode of operation, if the access request acknowledge is received within the first countdown timer period, wireless communication device 110 halts the first countdown timer (205) and then awaits a resource assignment message from wireless access node 130. As shown in FIG. 2, operations 201-207 are included in the first mode of operation of wireless communication device 110.

Wireless communication device 110 receives (208) a control message from wireless access node 130 to enter a second mode of operation. When in the second mode of operation, when requesting wireless communication access through wireless access node 130, wireless communication device 110 transmits (209) an access request to wireless access node 130 and starts a second countdown timer (210). Wireless communication device 110 then awaits (211) a resource assignment message from wireless access node 130. In this example, when in the second mode of operation, wireless communication device 110 does not await the access request acknowledge. Wireless communication device 110 determines (212) if the resource assignment message is received within the second countdown timer period. If the resource assignment message is not received within the second countdown timer period, wireless communication device retransmits (214) the access request to wireless access node 130. In some examples, the second countdown timer is then restarted and wireless communication device awaits the resource assignment message again as in operations 210-212.

However, when in the second mode of operation, if the resource assignment message is received within the second countdown timer period, wireless communication device 110 halts the second countdown timer (213). As shown in FIG. 2, operations 209-214 are included in the second mode of operation of wireless communication device 110.

Referring back to FIG. 1, wireless communication device 110 comprises radio frequency (RF) communication circuitry and an antenna. The RF communication circuitry typically includes amplifiers, filters, modulators, and signal processing circuitry. In many examples, wireless communication device 110 includes equipment to transmit access requests and receive access request acknowledges as well as resource assignment messages. Wireless communication device 110 may also include a user interface, memory device, computer-readable storage medium, software, processing circuitry, or some other communication components. Wireless communication device 110 may be a wireless communication device, telephone, computer, e-book, mobile Internet appliance, wireless network interface card, media player, game console, or some other wireless communication apparatus, including combinations thereof. Although one wireless communication device is shown in FIG. 1, it should be understood that a different number of wireless communication devices could be in communication with wireless access node 130.

Wireless access node 130 comprises RF communication and control circuitry and an antenna. The RF communication circuitry typically includes amplifiers, filters, RF modulators, and signal processing circuitry. In many examples, wireless access node 130 includes equipment to wirelessly receive access requests and transmit access request acknowledgments as well as resource assignment messages. Wireless access node 130 may also comprise a router, server, memory device, software, processing circuitry, cabling, power supply, network communication interface, physical structural support, or some other communication apparatus. Wireless access node 130 could be a base station, base transceiver station, Internet access node, telephony service node, wireless data access point, or some other wireless communication system, including combinations thereof.

Communication network 140 comprises the core network of a wireless communications provider, and could include routers, gateways, telecommunication switches, processing systems, or other communications equipment and systems for providing communication and data services. Communication network 140 may also comprise optical networks, asynchronous transfer mode (ATM) networks, packet networks, metropolitan-area networks (MAN), or other network topologies, equipment, or systems, including combinations thereof.

Wireless link 120 uses the air or space as the transport media. Wireless link 120 may use various protocols, such as Code Division Multiple Access (CDMA), Evolution Data Optimized (EVDO), Worldwide Interoperability for Microwave Access (WIMAX), Global System for Mobile Communication (GSM), Universal Mobile Telecommunications System (UMTS), Long Term Evolution (LTE), Wireless Fidelity (WIFI), High Speed Packet Access (HSPA), or some other wireless communication format, including combinations, improvements, or variations thereof.

Communication link 121 uses metal, glass, optical, air, space, or some other material as the transport media. Communication link 121 could use various communication protocols, such as Time Division Multiplex (TDM), asynchronous transfer mode (ATM), Internet Protocol (IP), Ethernet, synchronous optical networking (SONET), communication signaling, or some other communication format, including combinations, improvements, or variations thereof.

Communication links 120-121 may each include many different signals sharing the same link—as represented by the associated lines in FIG. 1—comprising access channels, forward links, reverse links, user communications, communication sessions, overhead communications, frequencies, timeslots, transportation ports, logical transportation links, network sockets, packets, or communication directions. Communication link 121 could be a direct link or may include intermediate networks, systems, or devices.

Figure 3:
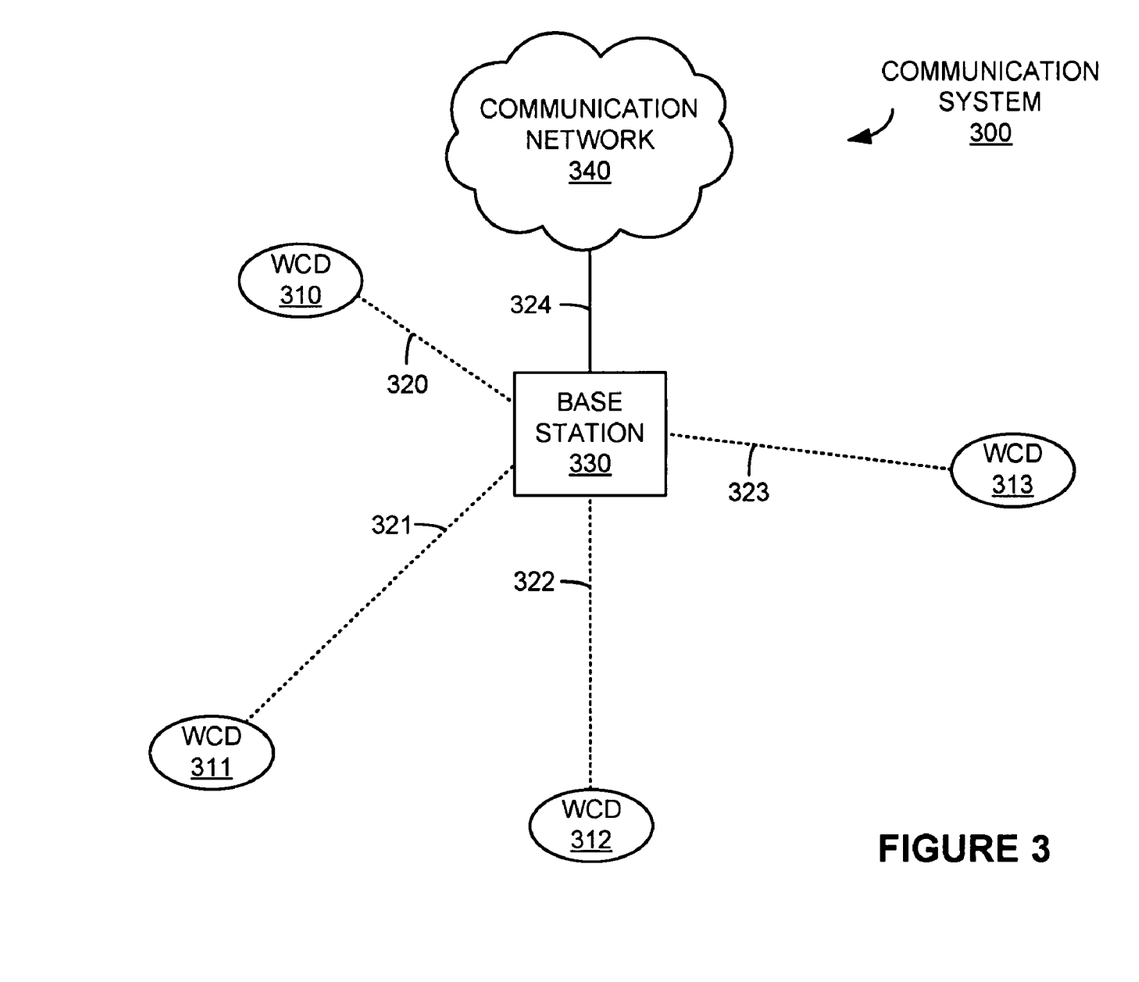
FIG. 3 is a system diagram illustrating a communication system.

FIG. 3 is a system diagram illustrating communication system 300. Communication system 300 includes wireless communication devices (WCD) 310-313, base station 330, and communication network 340. WCD 310-313 communicate with base station 330 over wireless links 320-323, respectively. Base station 330 and communication network 340 communicate over link 324.

WCD 310-313 are user devices, and comprise mobile wireless telephones in this example. Base station 330 includes wireless communications equipment capable of communicating with and providing communication service to wireless communication devices. Communication network 340 is a core network of a wireless communication provider in this example. Communication network 340 could include further base stations, routers, gateways, controller systems, processing systems, or other communication equipment. Wireless links 320-323 employ the CDMA wireless protocol, and link 324 is a T1 link in this example.

Figure 4:
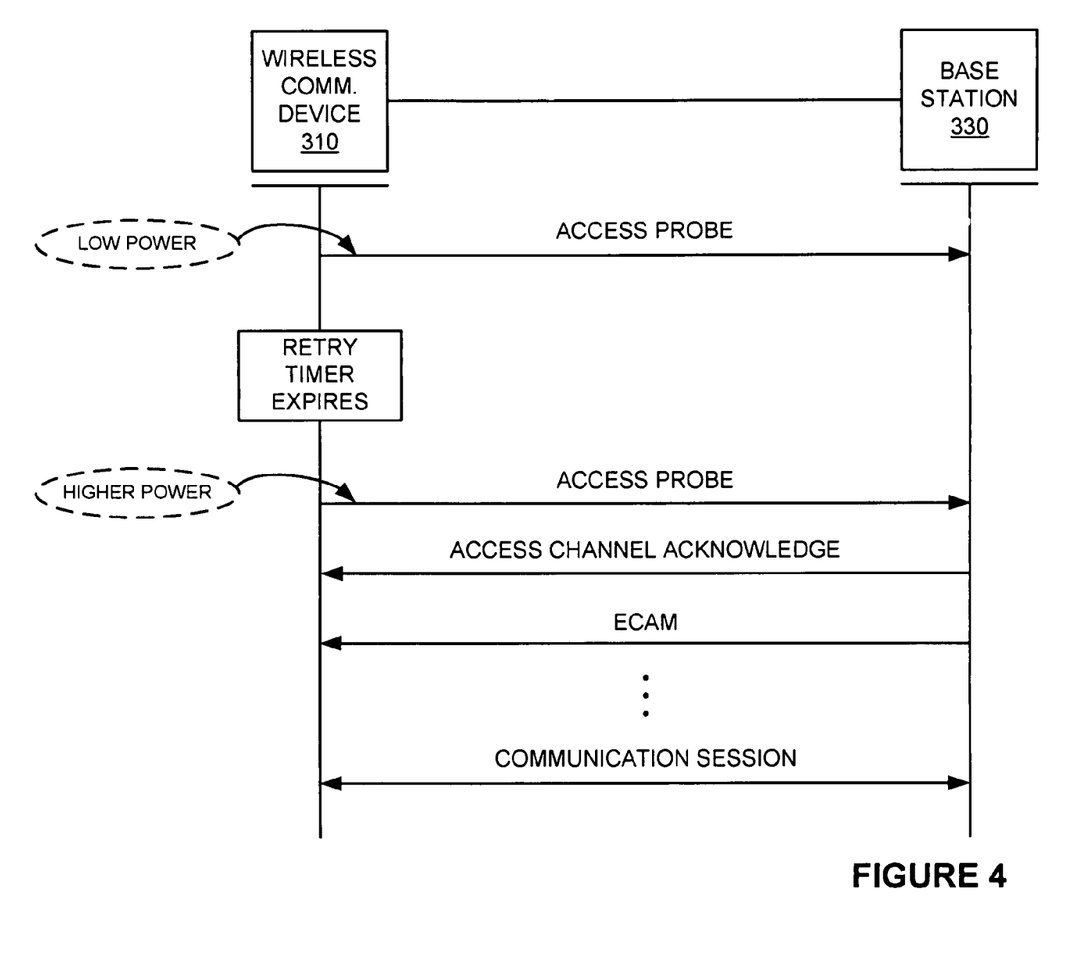
FIG. 4 is a sequence diagram illustrating an operation of a communication system.

FIG. 4 is a sequence diagram illustrating an example operation of communication system 300. In FIG. 4, wireless communication device (WCD) 310 is in a first mode of operation, and transfers an access probe to base station 330. In some examples, WCD 310 transfers the access probe to base station 330 when seeking to initiate communications with base station 330. In other examples, an access probe is transferred when a new communication session is desired by WCD 310 with base station 330. In further examples, WCD 311-313 could initiate communication sessions with base station 330 following a similar method.

These attempts to initiate communications can be referred to as probes, and indicate attempts by WCD 310 to establish a call or other communication session through base station 330. In many examples, it takes several probes before a communication session is established with base station 330. This number of probes required can be influenced by the amount of signal noise around WCD 310 or base station 330, the number and power level of other wireless communication devices communicating in the vicinity of WCD 310 or base station 330, the traffic loading of base station 330, the distance WCD 310 is from base station 330, or other factors. A high number of probes required to establish a communication session typically relates to increased power consumption needed for a communication session. Likewise, a low number of probes required to establish a communication session typically relates to decreased power consumption needed for a communication session. In some examples, the probes represent call attempts in a CDMA protocol, which could include an increasing probe transmit power level for each subsequent probe. In the example shown in FIG. 4, WCD 310 first transfers an access probe to base station 330 at a low power.

WCD 310 then starts a retry timer and awaits a response to the access probe from base station 330. In some examples, base station 330 does not quickly respond to the first access probe sent by WCD 310, in other examples, base station 330 does not properly receive the access probe from WCD 310. In this example, the retry timer expires and a second access probe is transferred by WCD 310 to base station 330 at a higher power. This higher power could help overcome a distance or noise limitation experienced by the first access probe.

In this example, base station 330 then responds to the second access probe with a CDMA access channel acknowledge (AC_ACK) message. Once WCD 310 receives the AC_ACK message, the retry timer is halted. This AC_ACK message could contain information to notify WCD 310 that base station 330 has received the access probe and other information relating to initiating communications between WCD 310 and base station 330. Although two access probe attempts are illustrated in FIG. 4, it should be understood that a different number of access probes could be transferred by WCD 310.

WCD 310 then awaits a CDMA extended channel assignment message (ECAM). The ECAM could contain further information relating to the communications between WCD 310 and base station 330. In CDMA examples, the AC_ACK is typically sent over a less efficient communication pathway than the ECAM. The ECAM includes information related to channel assignments and communication parameters for a communication session between WCD 310 and base station 330. Once the ECAM has been received by WCD 310, in this example, user communications of the communication session are exchanged between WCD 310 and base station 330. If a new communication session is initiated, a similar process as shown in FIG. 4 could be employed. It should be understood that further communications could occur after the ECAM and prior to exchange of user communications in the communication session.

Figure 5:
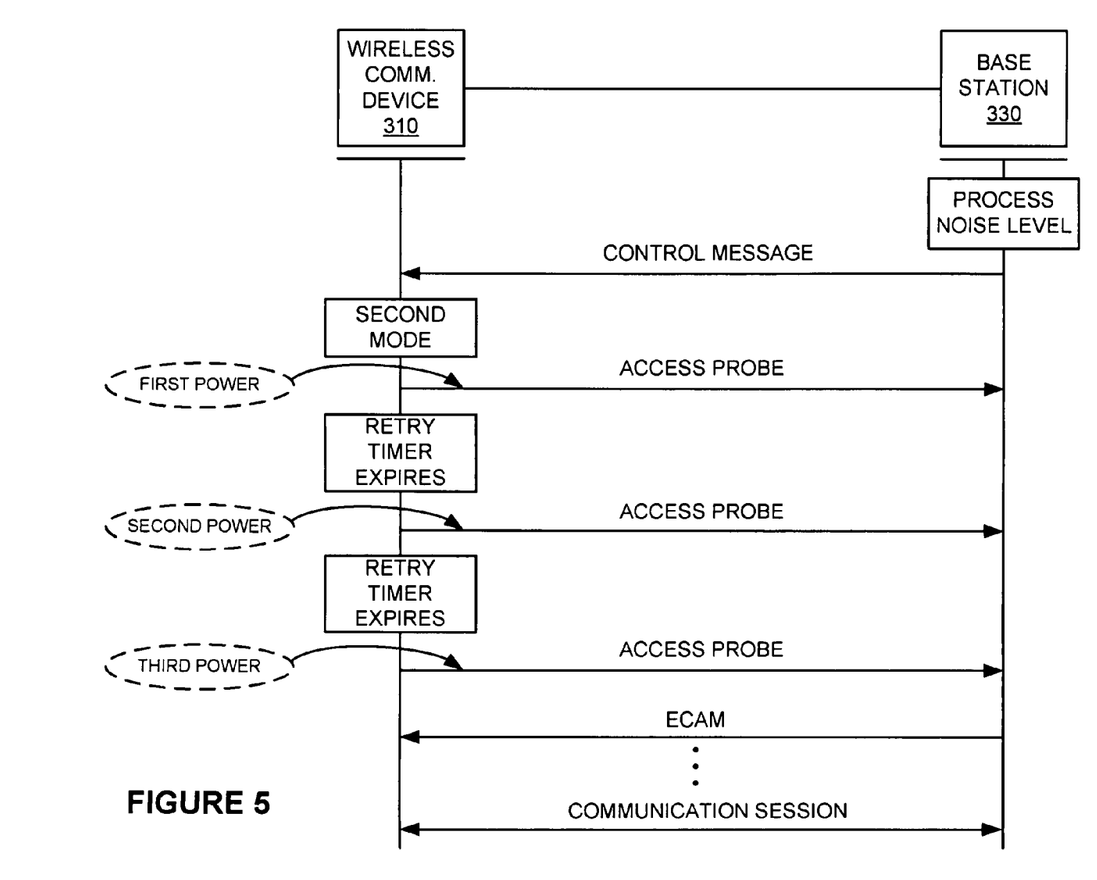
FIG. 5 is a sequence diagram illustrating an operation of a communication system.

FIG. 5 is a sequence diagram illustrating an example operation of communication system 300. In FIG. 5, base station 330 processes a noise level prior to sending a control message to WCD 310. The noise level could be a radio frequency (RF) noise level associated with base station 330, an increase in a noise floor for communications detected by base station 330 due to the communications of WCD 310-313, or other RF noise level measurements. In some examples, the noise level is a reverse noise rise (RNR) experienced by reverse-link communications received by base station 330. In other examples, the noise level is an RF signal-to-noise ratio as detected by base station 330.

If the noise level is determined to be lower than a performance threshold, base station 330 transfers a control message to WCD 310. The control message could also be transferred in a similar manner to any of WCD 311-313. The control message indicates to WCD 310 to enter into a second mode of operation. In this example, base station 330 determines the noise level is below a performance threshold and transfers the control message to WCD 310. The control message could be a part of other overhead communications between base station 330 and WCD 310, or could be a distinct message to place WCD 310 into the second mode of operation. In further examples, the control message could include information to place WCD 310 back into the first mode of operation, or into other modes of operation.

In response to the control message, WCD 310 enters into a second mode of operation. When in the second mode of operation, WCD 310 may initiate a communication session with base station 330 and transfer an access probe to base station 330 at a first RF power level. WCD 310 starts a retry timer and awaits a response to the access probe. However, WCD 310 is now in the second mode of operation, and awaits an ECAM in response to the access probe instead of the AC_ACK message.

In this example, base station 330 does not respond quickly to the first access probe sent by WCD 310, and the retry timer expires. A second access probe is transferred by WCD 310 to base station 330 at a second RF power level and the retry timer is restarted. Base station 330 also does not respond to the second access probe sent by WCD 310, and the retry timer again expires. A third access probe is transferred by WCD 310 to base station 330 at a third RF power level and the retry timer is restarted. After the third access probe, base station 330 responds to the third access probe with an ECAM within the period of the retry timer. Once WCD 310 receives the ECAM, the retry timer is halted. In typical examples, each access probe is transferred with an increasing RF power level. Although three access probe attempts are illustrated in FIG. 5, it should be understood that a different number of access probes could be transferred by WCD 310. Once the ECAM has been received by WCD 310, in this example, user communications of the communication session are exchanged between WCD 310 and base station 330. If a new communication session is initiated, a similar process as shown in FIG. 5 could be employed. It should be understood that further communications could occur after the ECAM and prior to exchange of user communications in the communication session.

In many examples, base station 330 has a greater delay associated with transferring an ECAM than with transferring an AC_ACK in response to an access probe. This delay could be due to a higher amount of processing to determine the ECAM as well as determining a channel assignment for WCD 310, among other causes. Due to the higher delay in transferring the ECAM, in many examples, an access probe transferred by WCD 310 can have a faster response time from base station 330 via an AC_ACK than an ECAM. Thus WCD 310 may end up transferring more access probes when in the second mode of operation while awaiting an ECAM instead of an AC_ACK, possibly ramping up transmission power with each access probe before an ECAM response to the access probe is received from base station 330. However, in many examples, an access request acknowledge, such as the AC_ACK message, consumes a larger amount of the resources of a wireless link than a resource assignment message, such as the ECAM. Advantageously, by transferring a control message to WCD 310 to place WCD 310 into a second mode of operation, base station 330 could forgo transferring the AC_ACK messages and only transfer ECAM messages in response to access probes, thus enabling a more efficient use of the resources of the wireless link. The higher efficiency of wireless links can be increasingly useful as the number of wireless communication devices in communication with base station 330 increases. However, as discussed above, the increase in delay for transferring an ECAM may result in a higher transmit power level from WCD 310, possibly causing a higher noise level as perceived by base station 330 or other wireless communication devices. This potentially higher noise level could be processed by base station 330 to determine if entry into the second mode of operation would be acceptable.

Although the example in FIG. 5 discusses base station 330 processing a noise level, other factors could be considered prior to transferring the control message. In some examples, a quality-of-service (QoS) level of WCD 310 is processed to determine if the control message should be transferred. In other examples, a number of present or current communication sessions active with base station 330 could be processed to determine if the control message should be transferred. In further examples, once base station 330 transfers a control message to enter WCD 310 into the second mode of operation, the parameters regarding the wireless communications, such as noise levels, could be monitored by base station 330. The parameters could be processed to determine if another control message should be transferred to WCD 310 to place WCD 310 back into the first mode of operation.

In yet further examples, WCD 310 could await either one of an access probe acknowledge, such as the AC_ACK, or a channel assignment message, such as the ECAM when in the second mode of operation. Although the examples in FIGS. 4 and 5 employ the CDMA wireless communication protocol, it should be understood that other wireless communication protocols could be employed, such as Universal Mobile Telecommunications System (UMTS), Long Term Evolution (LTE), or other wireless communication protocols. In UMTS, for example, an access request could include a random access channel (RACH) preamble.

Figure 6:
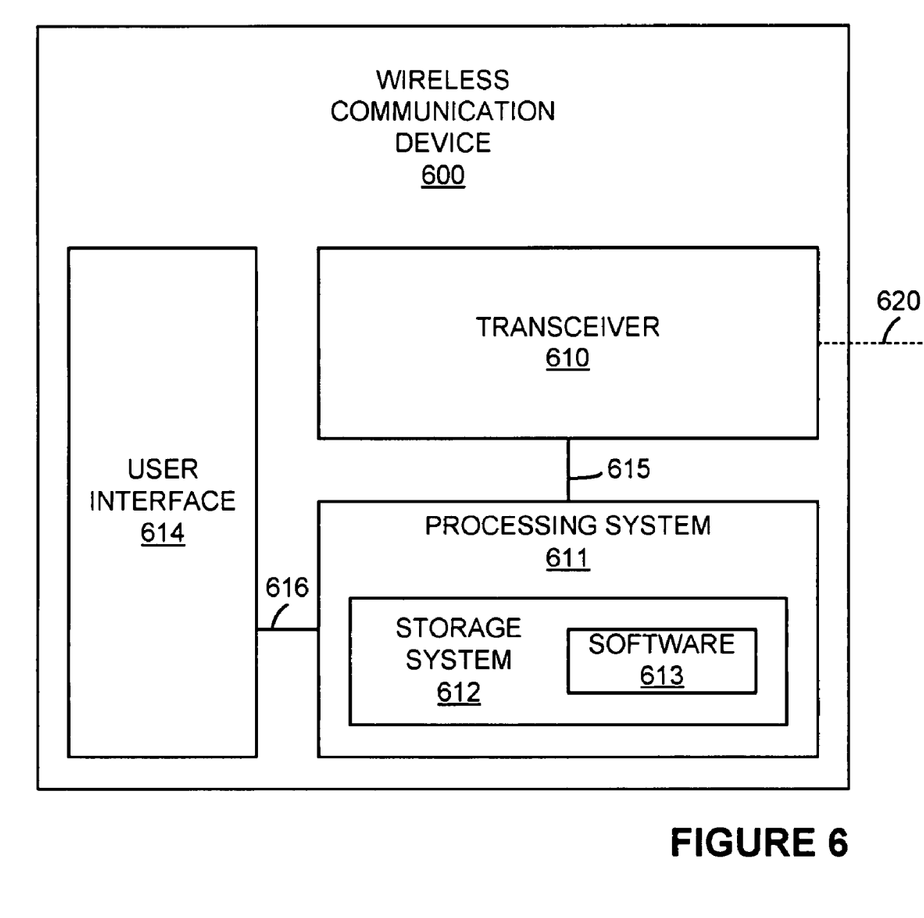
FIG. 6 is a block diagram illustrating a wireless communication device.

FIG. 6 is a block diagram illustrating an example of wireless communication device 600, as an example of WCD 110 found in FIG. 1 or WCD 310-313 found in FIG. 3, although WCD 110 or WCD 310-313 could use other configurations. Wireless communication device 600 includes transceiver 610, processing system 611, and user interface 614. Transceiver 610 and processing system 611 communicate over link 615. User interface 614 and processing system 611 communicate over link 616. Transceiver 610 communicates with a wireless access node, omitted for clarity, over wireless link 620. Wireless communication device 600 may be distributed among multiple devices that together form elements 610-616.

Transceiver 610 comprises radio frequency (RF) communication circuitry and an antenna. Transceiver 610 could also include amplifiers, filters, modulators, and signal processing circuitry.

Processing system 611 retrieves and executes software 613 from storage system 612. Processing system 611 could incorporate a computer microprocessor, logic circuit, or some other processing device, and may be distributed among multiple processing devices. In some examples, processing system 611 or user interface 614 are located within the same equipment in which transceiver 610 is located. Storage system 612 could include a computer-readable medium such as a disk, tape, integrated circuit, server, or some other memory device, and also may be distributed among multiple memory devices. Software 613 may include an operating system, logs, utilities, drivers, networking software, and other software typically loaded onto a computer system. Software 613 could contain an application program, firmware, or some other form of computer-readable processing instructions. When executed by processing system 611, software 613 directs processing system 611 to operate as described herein.

User interface 614 includes equipment and circuitry for receiving user input and control. Examples of user interface 614 include push buttons, selection knobs, dials, switches, actuators, keys, keyboards, pointer devices, microphones, transducers, potentiometers, non-contact sensing circuitry, or other human-interface equipment. In some examples, user interface 614 also includes equipment to communicate information to a user of wireless communication device 600. Examples of the equipment to communicate information to the user could include indicator lights, lamps, light-emitting diodes, displays, haptic feedback devices, audible signal transducers, speakers, buzzers, alarms, or other indicator equipment, including combinations thereof.

Links 615 and 616 each comprises physical, logical, or virtual communication link, capable of communicating data, control signals, and communications, along with other information. In some examples, links 615 and 616 are each encapsulated within the elements of transceiver 610, processing system 611, or user interface 614, and may each be a software or logical link. In other examples, links 615 and 616 each use various communication media, such as air, space, metal, optical fiber, or some other signal propagation path, including combinations thereof. Links 615 and 616 could be direct links or might include various equipment, intermediate components, systems, and networks. Wireless link 620 could use various protocols or communication formats as described herein for wireless link 120, including combinations, variations, or improvements thereof.

FIGS. 1-6 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication device, the method comprising:
   when in a first mode of operation, transmitting an access request for initiating wireless access to a wireless access node at a first transmit power, starting a first countdown timer, and awaiting a response to the access request which initiates the wireless access from the wireless access node;
   when in the first mode of operation, if the response to the access request is received within the first countdown timer, halting the first countdown timer and awaiting a resource assignment message indicating wireless access resource assignment information from the wireless access node, and if the response to the access request is not received within the first countdown timer, retransmitting the access request to the wireless access node at a second transmit power and restarting the first countdown timer;
   receiving a control message to enter a second mode of operation from the wireless access node; and
   when in the second mode of operation, transmitting the access request to the wireless access node, starting a second countdown timer, and awaiting the resource assignment message instead of the response to the access request from the wireless access node; and
   when in the second mode of operation, if the resource assignment message is received within the second countdown timer, halting the second countdown timer, and if the resource assignment message is not received within the second countdown timer, retransmitting the access request to the wireless access node and restarting the second countdown timer.

2. The method of claim 1, wherein when in the second mode of operation, transmitting the access request to the wireless access node comprises transmitting the access request to the wireless access node at the first transmit power; and wherein when in the second mode of operation, retransmitting the access request to the wireless access node comprises retransmitting the access request to the wireless access node at the second transmit power.

3. The method of claim 1, wherein when in the second mode of operation,
   if the response to the access request is received within the second countdown timer, halting the second countdown timer.

4. The method of claim 1, wherein the access request comprises a code division multiple access (CDMA) access probe.

5. The method of claim 1, wherein the response to the access request comprises a code division multiple access (CDMA) access channel acknowledge (AC_ACK).

6. The method of claim 1, wherein the resource assignment message comprises a code division multiple access (CDMA) extended channel assignment message (ECAM).

7. The method of claim 1, wherein the access request comprises a universal mobile telecommunications system (UMTS) random access channel (RACH) preamble.

8. A wireless communication device, comprising:
   a transceiver configured to transmit an access request for initiating wireless access to a wireless access node at a first transmit power when in a first mode of operation, and a processing system configured to start a first countdown timer upon transmission of the access request and await a response to the access request which initiates the wireless access from the wireless access node when in the first mode of operation;
   when in the first mode of operation, if the response to the access request is received within the first countdown timer, the processing system is configured to halt the first countdown timer and await a resource assignment message indicating wireless access resource assignment information from the wireless access node, and if the response to the access request acknowledge is not received within the first countdown timer, the transceiver is configured to retransmit the access request to the wireless access node at a second transmit power and the processing system is configured to restart the first countdown timer;
   the transceiver configured to receive a control message to enter a second mode of operation from the wireless access node;
   the transceiver configured to transmit the access request to the wireless access node when in the second mode of operation, and the processing system configured to start a second countdown timer upon transmission of the access request and await the resource assignment message instead of the response to the access request from the wireless access node when in the second mode of operation; and
   when in the second mode of operation, if the resource assignment message is received within the second countdown timer, the processing system is configured to halt the second countdown timer, and if the resource assignment message is not received within the second countdown timer, the transceiver is configured to retransmit the access request to the wireless access node and the processing system is configured to restart the second countdown timer.

9. The wireless communication device of claim 8, wherein when in the second mode of operation, the transceiver is configured to transmit the access request to the wireless access node at the first transmit power and retransmit the access request to the wireless access node at the second transmit power.

10. The wireless communication device of claim 8, wherein when in the second mode of operation,
 if the response to the access request is received within the second countdown timer, the processing system is configured to halt the second countdown timer.

11. The wireless communication device of claim 8, wherein the access request comprises a code division multiple access (CDMA) access probe.

12. The wireless communication device of claim 8, wherein the response to the access request comprises a code division multiple access (CDMA) access channel acknowledge (AC_ACK).

13. The wireless communication device of claim 8, wherein the resource assignment message comprises a code division multiple access (CDMA) extended channel assignment message (ECAM).

14. The wireless communication device of claim 8, wherein the access request comprises a universal mobile telecommunications system (UMTS) random access channel (RACH) preamble.

15. A method of operating a wireless communication system, the method comprising:
 in a wireless communication device when in a first mode of operation, transmitting an access request for initiating wireless access to a wireless access node at a first transmit power, starting a first countdown timer, and awaiting a response to the access request which initiates the wireless access from the wireless access node;
 in the wireless communication device when in the first mode of operation, if the response to the access request is received within the first countdown timer, halting the first countdown timer and awaiting a resource assignment message indicating wireless access resource assignment information from the wireless access node, and if the response to the access request is not received within the first countdown timer, retransmitting the access request to the wireless access node at a second transmit power and restarting the first countdown timer;
 in the wireless communication device, receiving a control message to enter a second mode of operation from the wireless access node; and
 in the wireless communication device when in the second mode of operation, transmitting the access request to the wireless access node, starting a second countdown timer, and awaiting the resource assignment message instead of the response to the access request from the wireless access node; and
 in the wireless communication device when in the second mode of operation, if the resource assignment message is received within the second countdown timer, halting the second countdown timer, and if the resource assignment message is not received within the second countdown timer, retransmitting the access request to the wireless access node and restarting the second countdown timer.

16. The method of claim 15, further comprising:
 in the wireless access node, monitoring a noise level associated with wireless communications at the wireless access node, and if the noise level is less than a performance threshold, transferring the control message to enter the second mode of operation.

17. The method of claim 16, wherein the noise level comprises a reverse noise rise, wherein the reverse noise rise comprises a rise in a noise floor at the wireless access node.

18. The method of claim 16, further comprising:
 in the wireless access node, if noise level is greater than the performance threshold, transferring a control message to enter the first mode of operation; and
 in the wireless communication device, receiving the control message to enter the first mode of operation from the wireless access node.

19. The method of claim 15, wherein when in the second mode of operation, in the wireless access node, halting transmission of the response to the access request in response to the access request.

20. The method of claim 15, wherein when in the second mode of operation,
 if the response to the access request is received within the second countdown timer, in the wireless communication device, halting the second countdown timer.

* * * * *